H. W. O'DOWD.
OVEN.
APPLICATION FILED SEPT. 28, 1912.

1,228,367.

Patented May 29, 1917.

Attest:

Henry W. O'Dowd Inventor:
by Joseph H. Freeman
Atty

UNITED STATES PATENT OFFICE.

HENRY W. O'DOWD, OF JERSEY CITY, NEW JERSEY.

OVEN.

1,228,367.     Specification of Letters Patent.     Patented May 29, 1917.

Application filed September 28, 1912. Serial No. 722,854.

*To all whom it may concern:*

Be it known that I, HENRY W. O'DOWD, a citizen of the United States, and a resident of Jersey City, Hudson county, State of New Jersey, have invented certain new and useful Improvements in Ovens, of which the following is a specification.

This invention relates to heating apparatus and more particularly to ovens for stoves and the like.

Objects of the invention are to provide an oven of such construction that the material being cooked can be easily and conveniently withdrawn during the cooking process, and at the same time such construction shall be simple, economical, and of few parts which shall be conveniently arranged. These and other objects of the invention will in part be obvious and in part more fully described and explained in the following description.

The invention consists in the novel parts, improvements, combinations, and features of construction herein shown and described.

In the accompanying drawings, which are referred to herein and form a part hereof, is illustrated an embodiment of the invention, the same serving in connection with the description herein to explain the principles of the invention.

Figure 1:
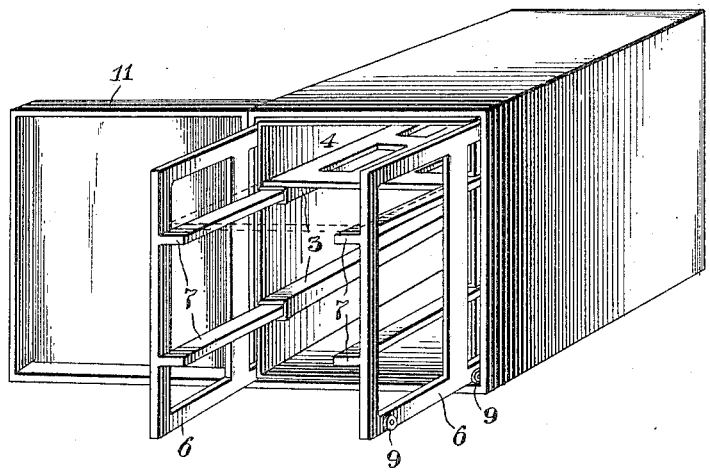
Figure 2:
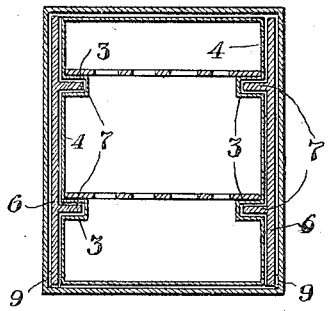

Of the drawings:

Figure 1 is a perspective view of an oven constructed in accordance with the invention; and Fig. 2 is a cross-section of the same.

Referring now in detail to the drawings, the invention is illustrated as embodied in an oven 1 suitable for use with a heating apparatus, as a stove. Means are provided for supporting vessels containing the objects to be treated, as the food to be cooked, as shown, said means consisting of a plurality of hollow or recessed ledges 3 suitably spaced apart on the side walls 4 of the oven and projecting a desired distance into the oven chamber. Preferably and as shown, also, said ledges 3 are provided in oppositely disposed registering pairs so that a tray or other container may be disposed upon each pair.

It is often desirable to withdraw the material being treated, as food being cooked, from the oven for inspection during the heating or cooking process. For this purpose, therefore, means are provided for supporting the container while so withdrawn. In the embodiment of the invention illustrated the casing of the oven 1 is formed with recesses in each of the sides 4 of the oven and preferably substantially coextensive therewith and communicating with the recesses of the ledges 3. In the recess on each side is arranged a frame 6 corresponding in size to the side of the oven and having shelves 7 arranged in the recesses of the ledges 3. It is obvious that each frame 6 may be drawn outwardly and while in this withdrawn position the shelves 7 will act as supports for the container for the food being cooked, while the latter is withdrawn for inspection. To facilitate the withdrawal of the frames, the same may be mounted on rollers 9. It will also be noted that when the frames are in inoperative position, the door 11 can be properly closed.

It will be seen that an oven constructed in accordance with the invention will carry out the objects of the invention, while possessing other advantages which will be apparent to those skilled in the art.

The invention in its broader aspects is not limited to the precise construction shown and described, as many changes may be made in the details thereof without departing from the main principles of the invention or sacrificing its chief advantages.

I claim:

1. In an oven the combination of a pair of sides, each side having a recess formed therein and substantially coextensive therewith, a plurality of recessed ledges projecting from said side and registering with similar recessed ledges projecting from the opposite side, said first-mentioned recess communicating with the recesses of the ledges, and a frame having shelves arranged to reciprocate in said recesses, substantially as described.

2. In an oven the combination of a pair of sides, each side having a recess formed therein and substantially coextensive therewith, a plurality of recessed ledges projecting from said side and registering with similar recessed ledges projecting from the opposite side, said first-mentioned recess communicating with the recesses of the ledges, a frame having shelves arranged to reciprocate in said recesses, and rollers arranged on said frame, substantially as described.

3. In an oven the combination of a pair of sides, each side having a recess formed therein, a plurality of recessed ledges projecting from said side and registering with similar recessed ledges projecting from the opposite side, said first-mentioned recess communicating with the recesses of the ledges, and a frame having shelves arranged to reciprocate in said recesses, substantially as described.

4. In an oven the combination of a pair of sides, each side having a recess formed therein, a plurality of recessed ledges projecting from said side and registering with similar recessed ledges projecting from the opposite side, said first-mentioned recess communicating with the recesses of the ledges, a frame having shelves arranged to reciprocate in said recesses, and rollers arranged on said frame, substantially as described.

In testimony whereof, I have signed my name to this specification, in the presence of two subscribing witnesses.

HENRY W. O'DOWD.

Witnesses:
WM. J. DOLAN,
LUTHER C. MORRISON.

Copies of this patent may be obtained for five cents each, by addressing the "Commissioner of Patents, Washington, D. C."